United States Patent [19]
VanCleve et al.

[11] Patent Number: 5,987,999
[45] Date of Patent: Nov. 23, 1999

[54] SENSITIVITY ENHANCING BALANCE BAR

[75] Inventors: Craig Brainerd VanCleve, Lyons; Charles Paul Stack, Louisville; Gregory Treat Lanham, Longmont, all of Colo.

[73] Assignee: Micro Motion, Inc., Boulder, Colo.

[21] Appl. No.: 09/108,294

[22] Filed: Jul. 1, 1998

[51] Int. Cl.[6] .................................................. G01F 1/84
[52] U.S. Cl. ................................ 73/861.357; 73/861.355
[58] Field of Search ....................... 73/861.357, 861.356, 73/861.355

[56] References Cited

U.S. PATENT DOCUMENTS

| | | | |
|---|---|---|---|
| 4,823,614 | 4/1989 | Dahlin | 73/861.357 |
| 5,531,126 | 7/1996 | Drahm | 73/861.356 |
| 5,616,868 | 4/1997 | Hegenmeyer | 73/861.357 |
| 5,796,012 | 8/1998 | Gomi et al. | 73/861.356 |

*Primary Examiner*—Harshad Patel
*Attorney, Agent, or Firm*—Duft, Graziano & Forest, P.C.

[57] ABSTRACT

A single tube Coriolis flowmeter having a balance bar that enhances the flowmeter sensitivity to material flow. The balance bar's design lowers its second bending mode response to have a frequency that may be lower than the flow tube resonant drive frequency. The lowering of the second bending mode frequency of the balance bar enables the Coriolis response of the vibrating flow tube with material flow to extend force from the flow tube through a brace bar to the balance bar. These Coriolis forces induce Coriolis-like response vibrations in the balance bar because of the lowered second bending mode frequency of the balance bar. The Coriolis response of the flowmeter is enhanced since the Coriolis-like response of the balance bar is out of phase with and is additive to the Coriolis deflection of the flow tube.

42 Claims, 10 Drawing Sheets

SENSITIVITY ENHANCING BALANCE BAR

FIELD OF THE INVENTION

This invention relates to a single tube Coriolis flowmeter and in particular, to a Coriolis flowmeter having a balance bar that enhances the sensitivity of the flowmeter to material flow.

PROBLEM

Single tube Coriolis flowmeters are desirable because they eliminate the expense and the plugging problems of flow splitting manifolds of dual tube Coriolis flowmeters. Single tube Coriolis flowmeters have a disadvantage in that their flow sensitivity has been lower than that of dual tube Coriolis flowmeters. The flow sensitivity is lower for two reasons. The first is that for the same flow rate, a single tube flowmeter must have a larger diameter flow tube for a given flow rate. This makes it stiffer in bending and less responsive to Coriolis forces. The second reason has to do with the details of how the mass flow rate is determined.

In traditional dual tube Coriolis flowmeters, the flow tubes are vibrated out of phase with each other. The dual flow tubes act as a counterbalance to each other to create a dynamically balanced structure. Velocity sensors are located at two locations along the flow tubes to sense the relative velocity between the flow tubes. The velocity sensors are usually located equal distances upstream and downstream from the tubes' midpoints. Each velocity sensor consists of a magnet fastened to one flow tube and a coil fastened to the other. The relative motion of the coil through the magnetic field produces a voltage. The sinusoidal motion of the vibrating flow tubes produces a sinusoidal voltage in each sensor. When there is no material flow, the voltages from the two velocity sensors are in phase with each other. With material flow, the vibrating tubes are distorted by the Coriolis force of the moving material to cause a phase difference between the two sensor voltages. The mass flow rate is proportional to this phase difference. It is important to note that both flow tubes are distorted equally (for an equal division of flow) and each flow tube has the same phase shift as the other at corresponding locations. The upstream sensor magnet velocity has the same phase as the upstream coil velocity and both have the same phase as the voltage generated by the magnet-coil sensor pair. The downstream sensor has a different phase than the upstream.

In single tube flowmeters, the vibrating flow tube is counterbalanced by a balance bar rather than another flow tube. Velocity sensor magnets (or coils) are mounted to the balance bar as though it were the second flow tube described above. However, since material does not flow through the balance bar, it does not experience any Coriolis force or significant phase shift with flow. The velocity sensors sense the relative velocity between the phase shifted flow tube and the non-phase shifted balance bar. The flow tube and balance bar velocities at each velocity sensor may be represented by velocity vectors having phase angle and amplitude. The relative velocity (and voltage out of each velocity sensor) can be determined by adding the two velocity vectors. The flow tube velocity vector has a phase shift due to material flow. The balance bar velocity vector has zero phase shift. Adding these vectors gives the net phase shift with flow of the velocity sensor. The net phase shift and output voltage of each velocity sensor is reduced by the non-phase shifted balance bar. This net phase shift reduction equates to a reduction in the flow sensitivity of the flowmeter. The reduction in flowmeter sensitivity due to the zero phase shift of the balance bar combined with the reduction in sensitivity due to the larger (single) flow tube diameter results in a combined flowmeter sensitivity so low as to impair the accuracy and commercial acceptance of single tube flowmeters for some applications.

SOLUTION

The above and other problems are solved and an advance in the art is achieved by the present invention in accordance with which a single tube Coriolis flowmeter is provided having a balance bar that enhances and amplifies flowmeter sensitivity to material flow. Both in the present invention as well as in prior art single tube Coriolis flowmeters, the balance bar is driven out of phase with respect to the flow tube in the first bending mode. The drive frequency is typically the resonant frequency of both the balance bar and the material filled flow tube in the first bending mode of each. In prior art single tube Coriolis flowmeters the balance bar lacks significant response to the Coriolis forces and Coriolis deflections of the flow tube. In the present invention sensitivity enhancement is achieved by designing the balance bar so that it responds to the Coriolis forces on the flow tube by bending, in its second bending mode, out of phase with respect to the flow tube deflections caused by the applied Coriolis forces.

With material flow, the vibrating flow tube deflects in response to the applied Coriolis forces. The drive vibrations of the flow tube are substantially greater in amplitude than the Coriolis deflections since they are at the resonant frequency of the material filled flow tube while the Coriolis deflections are driven at a frequency far from the resonant frequency of the flow tube for the Coriolis deflection mode shape. The Coriolis forces are applied by the flowing material to the flow tube at the same frequency as the drive vibrations. The Coriolis force induced deflection of the flow tube, however, is of the same shape as the second bending mode. The second bending mode resonant frequency of the flow tube is much higher than the frequency of application of the Coriolis force (the drive frequency). Thus, because the Coriolis force is applied at a frequency far removed from the resonant frequency of its mode shape (the second bending), the Coriolis induced deflections in the flow tube are very much smaller than the driver induced (first bending mode) deflections. The small Coriolis deflection in the second bending mode of the flow tube is what produces the phase delay between the two velocity sensor signals in response to material flow. Because the deflection is small, the phase delay is small, and the sensitivity of prior art straight tube meters to material flow is low.

The balance bar of the present invention is connected at its ends to the flow tube by means of brace bars which transmit the vibrational forces of the flow tube to the balance bar. In prior art meters the balance bar, like the flow tube, has its second bending mode resonant frequency much higher than the first bending or drive mode. Since the Coriolis deflections of the flow tube are very small and occur at a frequency far removed from the balance bar second bending resonant frequency, the forces transmitted to the balance bar by way of the brace bars result in no significant excitation of the second bending mode of the balance bar. Thus, while in prior art meters the flow tube has little response to the Coriolis forces, the balance bar has none.

The present invention involves shifting the frequency order of the various mode shapes of the balance bar. This can be confusing. The vibration modes are defined according to their shapes, not their frequency order. A useful rule is that the mode number is equal to the number of nodes minus one. The first mode has two nodes (at the ends). The second has three (at the ends and in the center). The third bending mode has four nodes, etc.

In accordance with the present invention, the second mode bending frequency of the balance bar is lowered so that it is close to the first bending mode (drive frequency) of both the flow tube and the balance bar. The first bending (drive) mode which has large vibration amplitude in both the flow tube and the balance bar, fails to excite the balance bar in the second bending mode because of the difference in mode shapes. In the first bending mode the deflected shape of the balance bar (and flow tube) is such that the ends have no displacement while the length between the ends has increasing displacement with the maximum displacement occurring at the center. In the second bending mode the ends and center have no displacement with the maximum displacements occurring at about the one quarter and three quarter length points. However, the sign of the displacement changes at the center point so that one-half of the balance bar (or flow tube) has positive displacement while the other half has negative displacement. The result of the difference in mode shapes is that while the vibration of the first bending mode is putting energy into one half of the balance bar in the second bending mode, it is taking an equal amount of energy out of the other half of the balance bar. Therefore the net effect is that the second bending mode is not excited by vibration in the first bending mode even though the resonant frequencies may be close.

The Coriolis deflection of the flow tube has the same shape as the second bending mode in that the displacement of the flow tube has an opposite sign on either side of the flow tube center point. Thus the Coriolis deflection of the flow tube is able to excite the second bending mode of the balance bar via the forces transmitted through the brace bars. In the present invention the second bending mode resonant frequency of the balance bar is made close to the drive frequency. The excitation of the balance bar second bending mode by the Coriolis deflection of the flow tube becomes sufficient to cause significant phase delay in the balance bar at the velocity sensor locations. This phase delay between the balance bar locations adds to the phase delay between the corresponding flow tube locations and enhances the sensitivity of the meter to flow.

In accordance with a first embodiment of the invention, the second bending mode resonant frequency of the balance bar is below the drive frequency of the flow tube and the balance bar. It is well known that when a mechanical oscillator's resonant frequency is below the exciting frequency, the oscillator moves out of phase to the exciting displacement. As a result, the balance bar assumes a deflection that is out of phase with the Coriolis induced deflection on the flow tube. Because the balance bar's excitation source for its second bending mode is the Coriolis deflections of the flow tube, the vibration amplitude of the balance bar's second bending mode deflections increase as the Coriolis force on the flow tube increases. These out of phase second bending mode deflections of the flow tube and the balance bar permit a velocity sensor coupled to the flow tube and balance bar to generate output signals of increased phase delay (sensitivity) compared to that of prior art single tube Coriolis flowmeters.

The reduction of the second bending mode frequency of the balance bar below the drive frequency is achieved by a physical re-design of the balance bar that includes a redistribution of its mass and stiffness. Mass is removed from the central portion of the balance bar which tends to raise the drive frequency while having little impact on the second bending frequency. The mass removal has little impact on the second bending mode frequency because the second bending mode has little amplitude near the center. Mass is then added to the balance bar near the velocity sensor locations which lowers the second bending mode frequency more than the drive frequency because these are the locations where the second bending mode amplitude is greatest.

Balance bar stiffness is modified by greatly softening it in the regions of high bending in the second bending mode. These locations are slightly toward the center from the velocity sensor locations. Removing stiffness in these areas greatly reduces the second bending mode frequency while having little effect on the drive frequency since in the drive mode there is little bending in these areas. Finally, stiffness in the central section of the balance bar, between the soft areas, is increased to further raise the drive frequency while having little effect on the second bending frequency.

These physical modifications of the balance bar can reduce its second bending mode frequency so that it is lower than its first bending mode (drive) frequency. When this is achieved, the Coriolis vibrations of the flow tube are transmitted from the flow tube through the brace bars to the ends of the balance bar. This induces the Coriolis like deflections in the balance bar that are out of phase with the Coriolis deflections of the flow tube. These deflections are referred to as "Coriolis like" in that they assume a mode shape that is similar to that of a flow tube being deflected by Coriolis force. The flow tube and balance bar of the present invention thus perform like a dual tube Coriolis flowmeter wherein each of the flow tubes assumes a Coriolis vibratory response that is out of phase with respect to the other flow tube. The result is that the single tube meter of the present invention can have the flow sensitivity of a dual tube meter.

The phase of the balance bar second bending mode vibration with respect to the phase of the Coriolis deflection of the flow tube depends upon the relationship of the resonant frequency of the balance bar second bending mode to the first bending mode (drive) frequency. The second bending mode frequency can either be less than, equal to, or greater than the first bending mode (drive) frequency. If the second bending mode frequency is higher than the drive frequency, the balance bar second bending mode vibrates in phase with the Coriolis induced vibration of the flow tube. This tends to reduce sensor phase shift and flowmeter sensitivity. If the balance bar's second bending mode frequency is below the drive frequency, as above discussed, the balance bar second bending mode vibrates out of phase with the flow tube's Coriolis induced vibration to increase sensor phase shift and flowmeter sensitivity.

Flowmeter sensitivity is reduced when the second bending mode frequency is above the first bending mode drive frequency. The reason for this is that the flow tube's Coriolis vibration and the balance bar's second bending mode vibration are in phase. The velocity sensors sense relative velocity between the flow tube and balance bar which means that in phase motions tend to negate each other. This however, can be a useful embodiment in certain applications. If the balance bar second bending mode frequency is sufficiently close to the first bending mode drive frequency, its amplitude and phase can be made so large so as to overwhelm the flow tube's opposite phase. This configuration can result in a flowmeter having improved sensitivity.

The configuration in which the balance bar second bending mode frequency is below the drive frequency is, however, preferred because the phases of the flow tube and balance bar add and also because the balance bar tends to balance the flow tube in both the drive mode and the Coriolis/second bending modes. In conventional single tube meters, the balance bar balances the flow tube shaking forces in the first bending mode only. The second bending mode frequency of the balance bar is at a much higher frequency than the Coriolis mode of the flow tube. Therefore, the second bending mode is not excited in the balance bar. This results in the Coriolis forces being unbalanced and causing the flowmeter to shake. Meter shaking can shift flowmeter sensitivity and cause errors. The shaking of the meter is a function of both flow rate and mounting stiffness. Since the mounting stiffness is not generally known, this sensitivity shift cannot be predicted or compensated.

In the present invention, the balance bar's second vibration mode is excited by the Coriolis mode of the flow tube. When the second bending mode is below the drive frequency, the flow tube and the balance bar vibrate out of phase with each other and the vibrating forces of the balance bar's second bending mode can cancel the shaking effect of the Coriolis force on the flow tube. The amplitude of the balance bar's second mode vibration increases as the Coriolis forces increase. This maintains the same degree of balance for the flow tube over all flow rates.

In summary, the Coriolis flowmeter of the present invention includes a balance bar whose physical characteristics permit it to have a second bending mode frequency that is lower than and near to its first bending mode (drive) frequency. This permits the balance bar to respond to the Coriolis deflections of the flow tube by producing Coriolis like deflections of its own which are out of phase with the Coriolis deflections of the flow tube. This out of phase relationship between the Coriolis deflections of the flow tube and the Coriolis like deflections of the balance bar provide an increased net phase shift out of each velocity sensor and, in turn, a sensitivity to flow comparable to that of a dual tube Coriolis flowmeter. Furthermore, the balance bar of the present invention balances the Coriolis forces as well as the first bending mode shaking forces.

DESCRIPTION OF THE DRAWINGS

The above and other advantages of the features of the invention may be better understood from a reading of the following detailed description thereof taking in conjunction with the drawings in which.

DETAILED DESCRIPTION

The present invention overcomes the problem of low sensitivity in single tube flowmeters by the provision of a balance bar that amplifies flowmeter sensitivity. In order to understand how this is done it is necessary to understand the nature of the Coriolis force on the flow tube, the distortion this produces in the flow tube, and how the distortion results in phase shift along the flow tube.

Figure 1:
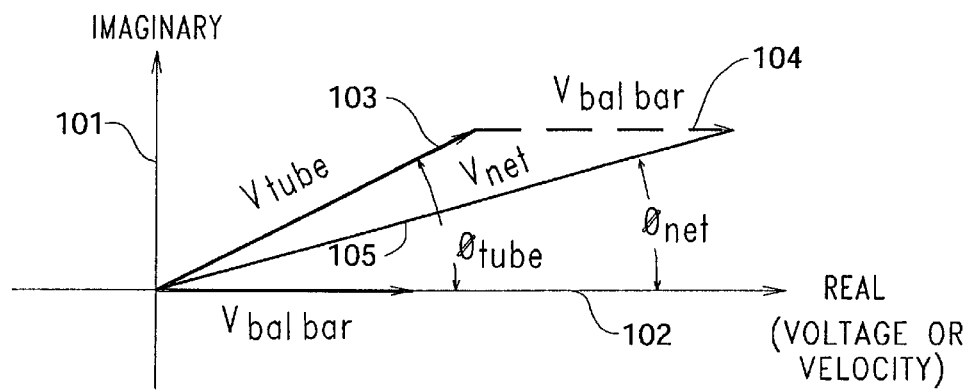
FIG. 1 is a vector diagram of a prior art single tube Coriolis flowmeter.

FIG. 1 is later described and is a vector diagram of the vibrational velocities of the flowmeter of FIG. 6.

Figure 2:
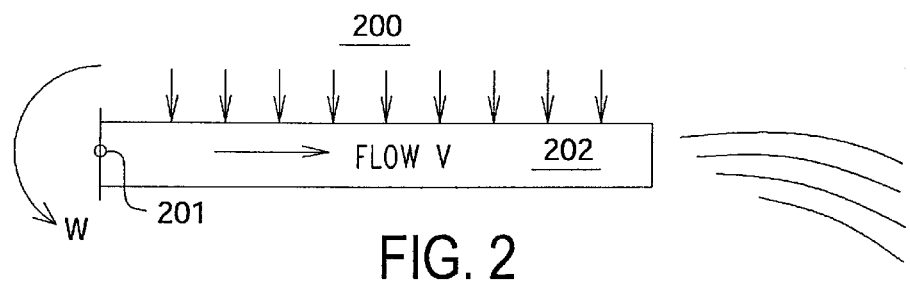
FIG. 2 discloses a rotating flow tube.

FIG. 2 shows a tube 202 through which material is flowing as it rotates counterclockwise about its end 201. The Coriolis force per unit length of tube 202 can be derived from the equation for Coriolis acceleration $A_c$ and Newton's law.

Coriolis acceleration may be expressed as:

$$A_c = 2(\vec{\omega} \times \vec{v}) \qquad \omega = \text{angular velocity}$$

$$v = \text{fluid velocity}$$

Coriolis Force $F_c$ may be expressed as:

$$F_c = MA_c = 2M(\vec{\omega} \times \vec{v}) \qquad M = \text{fluid mass}$$

$$\rho = \text{fluid density}$$

since fluid $M = \rho A_t l$ $\qquad A_t = \text{tube flow area}$ $l = \text{tube length}$ $$F_c = 2\rho A_t l(\vec{\omega} \times \vec{v})$$

$$\frac{F_c}{l} = 2\rho A_t (\vec{\omega} \times \vec{v})$$

but:

$$\rho A_t \vec{v} = \dot{M} \qquad \dot{M} = \text{mass flow rate}$$

$$\frac{F_c}{l} = 2\dot{M} \times \vec{\omega}$$

The Coriolis force $F_c$ is uniform along the length of tube 202 because each part of tube 200 is rotating at the same rate and the mass flow rate is the same throughout the flow tube.

Figure 3:
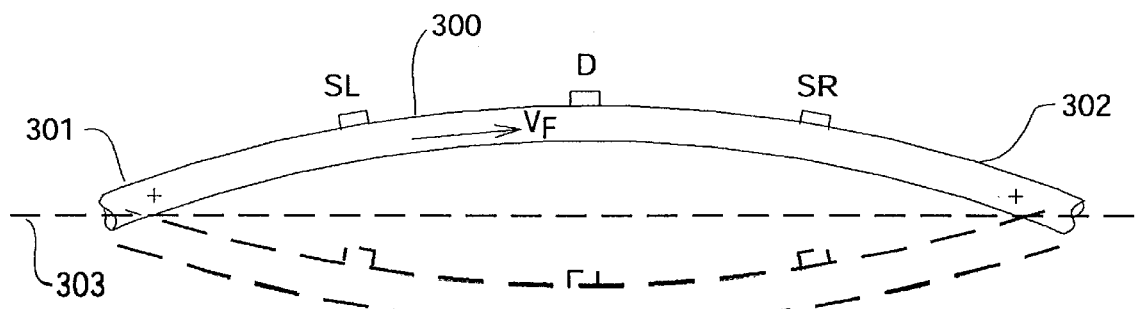
FIG. 3 discloses a vibrating flow tube.

FIG. 3 shows a straight flow tube 300 that is free to pivot about each end 301 and 302 but is fixed in translation at ends 301 and 302. Flow tube 300 is vibrated by driver D in the first bending mode at its resonant frequency, like a guitar string, while material flows through it. As the flow tube passes through its straight (zero displacement) position 303 downwards, it's left half rotates clockwise while its right half rotates counterclockwise. The rotations decrease as the tube's center is approached. The center does not rotate but merely translates. The spacial distribution of Coriolis forces on the flow tube 300 as it passes through zero displacement 303 is shown on FIG. 4. The Coriolis force is in opposite directions on the two halves because the tube rotation directions are opposite. The Coriolis force diminishes to zero at the center because the rotation of the tube diminishes to zero at the center.

Another major difference between vibrating tube 300 of FIG. 3 and the rotating tube 202 of FIG. 2 is that vibrating tube 300 does not rotate continuously, but stops and reverses direction. At the vibration direction reversal, the rotations are zero and the Coriolis force on the entire flow tube is zero. The result is that the magnitude of the Coriolis forces of FIG. 4 vary sinusoidally with time with the maximum occurring as the flow tube vibration goes through zero amplitude and maximum velocity as shown on FIG. 4. Zero Coriolis force occurs on the entire flow tube as the flow tube reaches its maximum vibration amplitude and zero velocity in the first bending (drive) mode. The frequency of the sinusoidal application of the Coriolis force to the flow tube is the same as the frequency at which it is being vibrated; namely, the flow tube's first bending (drive) mode vibration frequency.

Figure 4:
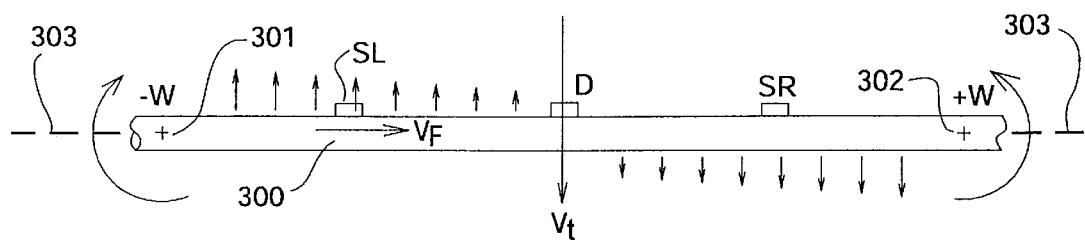
FIG. 4 discloses the Coriolis forces applied to the flow tube of FIG. 3.
Figure 5:
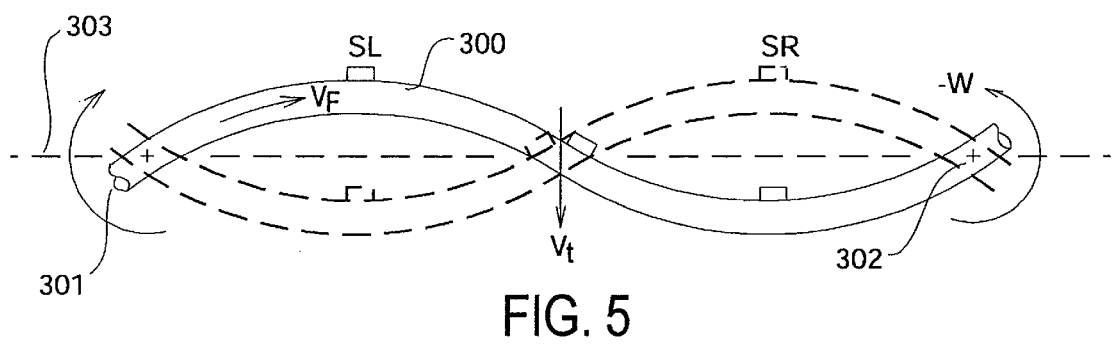
FIG. 5 discloses the Coriolis response of the flow tube of FIG. 3.

Flow tube 300 bends in response to the periodic Coriolis force as shown in FIG. 5. The solid line shows the shape (greatly exaggerated) the tube takes in response to the Coriolis force as the tube passes downward through zero displacement in the drive mode. The dashed line shows the shape the tube takes as it moves upward through zero displacement in the drive mode. Note that the only point on the flow tube that is in fact passing through zero at this instant is the mid point of the tube. The shape of FIG. 5 is similar to the second bending mode shape. However, this is just a coincidence. The frequency of the second bending mode of the flow tube is much higher than the frequency at which the Coriolis force of FIG. 4 is applied (the frequency of the first bending mode). Since the flow tube is being excited by Coriolis forces at well below its second bending resonant frequency, this Coriolis caused deformation of FIG. 5 and the Coriolis force of FIG. 4 occur in phase with each other. Flow tube 300 therefore assumes the shape of FIG. 5 as it crosses zero displacement axis 303 in its driven vibration (first bending) mode. Material flow superimposes the Coriolis induced vibration of FIG. 5 on the driven vibration of FIG. 3. This is shown on FIG. 6. Both vibrations occur at the first bending mode drive frequency; but they are phase shifted from each other by ninety degrees. The Coriolis induced displacement maximum (solid lines) occurs when the first bending mode is at zero displacement along axis 303. The Coriolis displacement becomes zero when the first bending mode is at maximum displacement (dashed lines). FIG. 6 is analogous to FIG. 4 in that it represents the state of the flow tube in so far as Coriolis deflections are concerned at the time flow tube 300 crosses zero axis 303. At this time, and at this time only, the Coriolis forces and Coriolis induced deflections are at a maximum amplitude. As already explained for FIG. 4, the Coriolis forces diminish and ultimately become zero when the deflection of flow tube 300 reaches its maximum in either an upwards or downward direction. At this time, the velocity of the flow tube is zero and so are the applied Coriolis forces and resultant Coriolis deflection. Thus, the sinusoidal Coriolis response shown in FIG. 5 varies sinusoidally in amplitude at the drive frequency as flow tube 300 is vibrated sinusoidally in its first bending mode between its maximum positive and negative deflection by the drive signal. The amplitude of the Coriolis displacement shown on FIGS. 5 and 6 is greatly exaggerated for clarity. The amplitude is in reality much less than the amplitude of the first bending mode of flow tube 300 because the first bending mode is driven at the resonant frequency of the flow tube and the Coriolis mode is not. Thus, the Coriolis deformations shown in all the figures are greatly exaggerated.

The phase delay associated with material flow in prior art meters is the result of the superposition of the first bending (drive) mode and the Coriolis deflection of the flow tube. In FIG. 5 it can be seen that right velocity sensor SR crosses zero displacement before left velocity sensor SL. It can be said that the left sensor and its output voltage lag the phase of the right sensor and its output voltage. Conversely, it can also be said that the right sensor SR leads the phase of the left sensor SL. The phase difference (or time delay) is proportional to the amplitude of the Coriolis induced displacement which is, in turn, proportional to the mass flow rate.

The present invention involves shifting the frequency order of the various mode shapes of the balance bar. The vibration modes are defined according to their shapes, not their frequency order. The first bending mode will hereafter be referred to as that shown in FIG. 3. The second bending mode will be of the shape shown in FIG. 5. A useful rule is that the mode number is equal to the number of nodes minus one. The first mode has two nodes (at the ends). The second has three (at the ends and in the center). The third bending mode has four nodes, etc.

In conventional single tube Coriolis flowmeters, the balance bar only vibrates in the first bending mode and lacks any response to Coriolis forces on the flow tube. FIG. 6 shows a single tube Coriolis flowmeter 600 having a flow tube 601 and a balance bar 602 connected by brace bar 603 and 604 at the ends of balance bar 602. The solid lines of FIG. 6 shows flow tube 601 and balance bar 602 as they cross zero displacement axis 303 in the first bending (drive) mode with material flow. No Coriolis deflections appear on balance bar 602 on FIG. 6. The dashed lines show the flow tube and balance bar at the outward extent of their vibration in the first bending (drive) mode.

Figure 6:
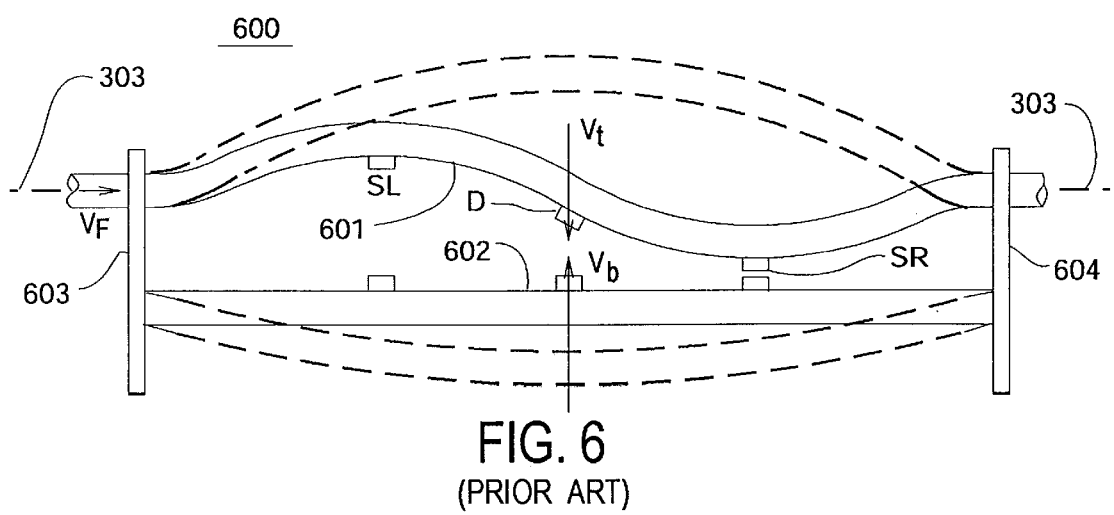
FIG. 6 discloses a straight tube Coriolis flowmeter.

FIG. 1 is a vector diagram disclosing the vibrational velocities generated by the conventional single straight tube Coriolis flowmeter as represented in FIG. 6. The response of the flow tube at the right velocity sensor SR is vector 103 which has a leading phase, $\phi$ tube, represented by the angle between vector 103 and the real axis 102. The vibrational velocity of the balance bar is not shifted in phase from axis 102 since the balance bar is not affected by the generated Coriolis forces on the flow tube. The balance bar vector is shown along the real axis 102 and is entitled $V_{Bal\ bar}$. The vector sum of the flow tube and balance bar velocities is 105. Vector 105 has a phase angle $\phi_{net}$ representing the combined vector velocities and phases of the flow tube and balance bar. Note that the net phase angle out of the right sensor SR is less than the phase angle for the tube alone. The reduction in phase angle (and sensitivity) is due to the lack of phase shift of the balance bar in conventional single tube meters.

Figure 7:
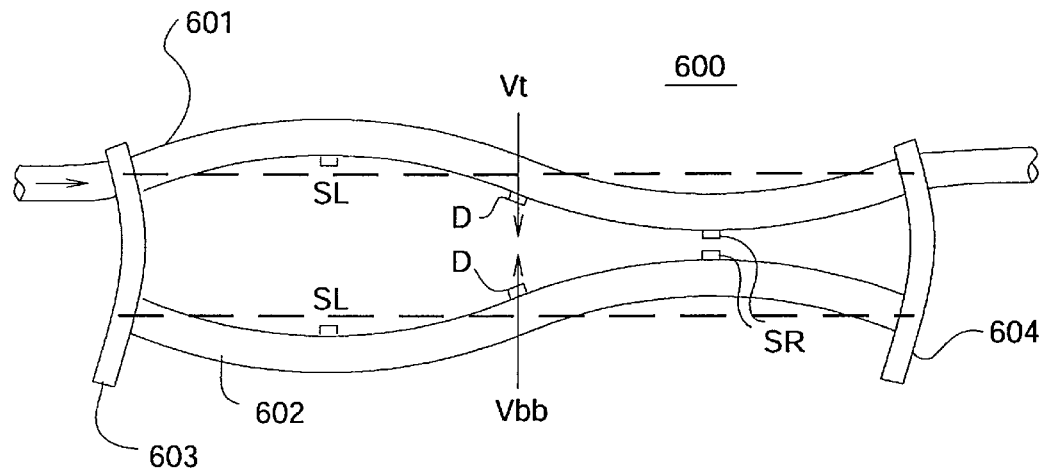
FIGS. 7 and 8 disclose the Coriolis vibrational characteristics of a single tube Coriolis flowmeter of the present invention.
Figure 9:
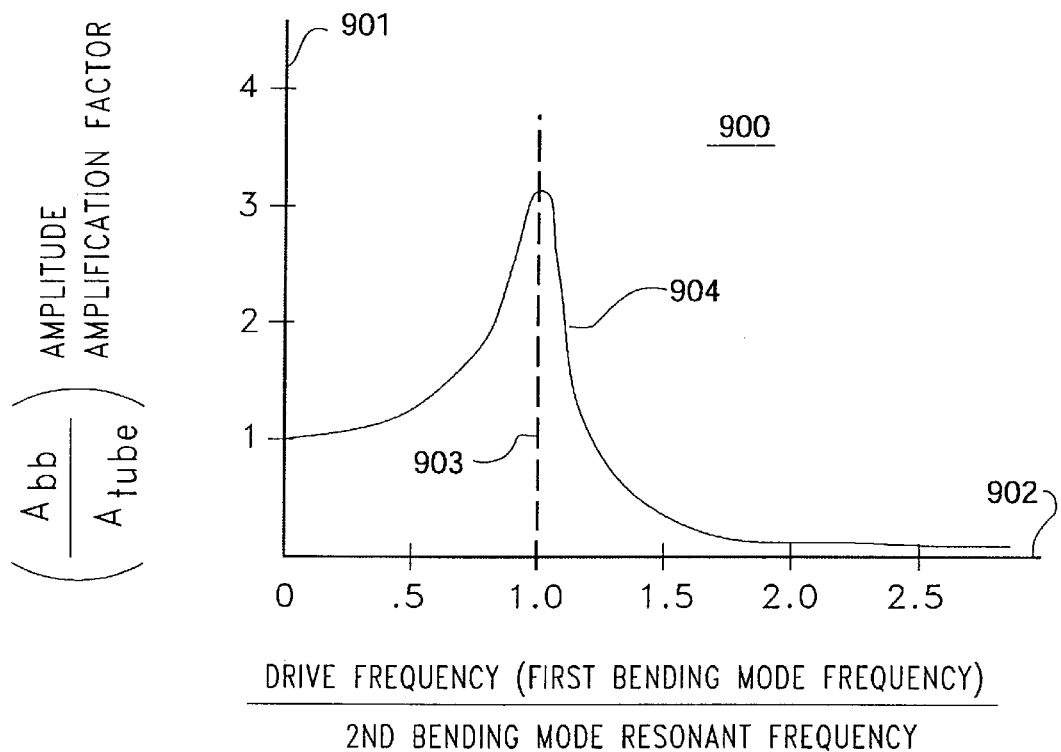
FIGS. 9 and 10 disclose frequency response curves of the flowmeter of the present invention.

One embodiment of the present invention, as shown in FIG. 7, provides a balance bar whose second bending mode resonant frequency is slightly below the first bending mode drive frequency. The Coriolis induced deflection of flow tube 601 excites the second bending mode in the balance bar 602 byway of brace bars 603 and 604. The amplitude of the balance bar 602 vibration in its second bending mode is proportional to the Coriolis deflection amplitude of flow tube 601 and thus is proportional to the material flow rate. The vibration amplitude of balance bar 602 in its second bending mode on FIG. 7 is also a function of the separation between the first bending mode (drive) frequency and the balance bar second bending mode resonant frequency. The closer the second bending mode frequency of the balance bar is to the first bending mode (drive) frequency, the greater will be the vibrational amplitude of the balance bar in its second bending mode. This relationship is shown in detail on FIG. 9 which is a graph of the vibrational amplitude of the balance bar in its second bending mode with respect to the ratio between the first bending mode (drive) frequency and the balance bar 602 second bending mode resonant frequency. The x axis 902 indicates the ratio between the first bending mode (drive) frequency and the second bending mode resonant frequency of the balance bar. The y axis 901 represents the amplification factor of the Coriolis response of balance bar 602. As can be seen, the Coriolis response induced in balance bar 602 is at a maximum when the ratio between the drive frequency and the second bending mode resonant frequency of the balance bar is 1.0. The Coriolis response 904 of the balance bar decreases towards zero from its maximum as the ratio of the two frequencies on FIG. 9 become greater than 1.0. The Coriolis response of the balance bar also decreases from its maximum as the ratio of these two frequencies becomes less than one. FIG. 9 shows that when the two frequencies are relatively close, the vibrational amplitude $A_{bb}$ of balance bar in its second bending mode can be much higher than the Coriolis induced amplitude of flow tube 601. As subsequently described, the preferred embodiment of the present invention operates the Coriolis flowmeter under conditions in which the second bending mode resonant frequency is slightly lower than the first bending mode (drive) frequency. Under such conditions the frequency ratio is slightly greater than one. For another embodiment, the ratio between the two frequencies may be slightly less than one. At that time, the Coriolis flowmeter is operated so that it's response 904 on FIG. 9 is slightly to the left of abscissa 903 representing a ratio of 1.0.

Figure 10:
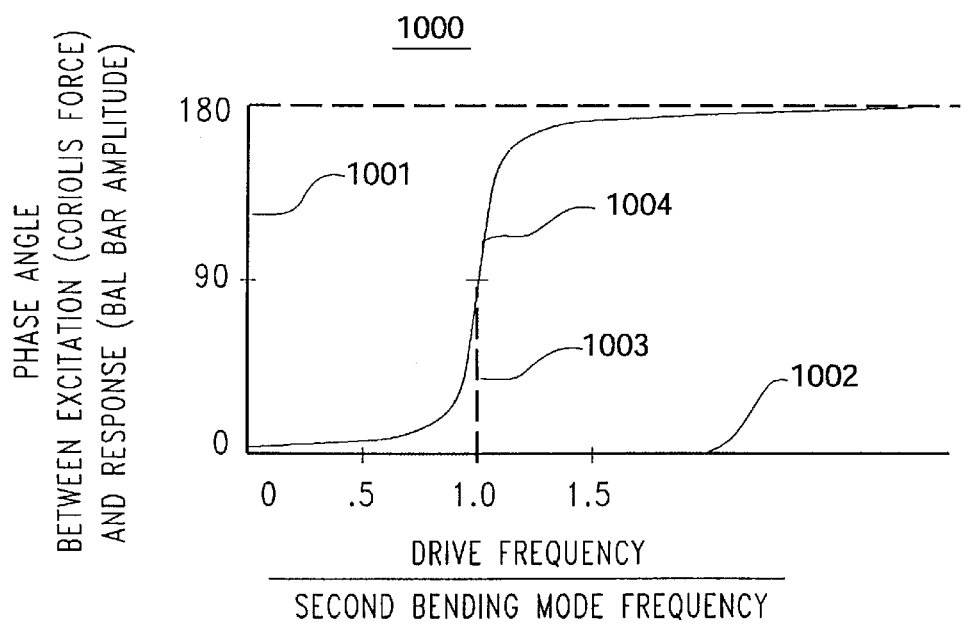

The phase of the balance bar second bending mode vibration with respect to the phase of the Coriolis deflection of the flow tube depends on the relationship of its second bending mode resonant frequency to the first bending mode (drive) frequency as shown in FIG. 10. Remember that it is not the drive mode that excites the second bending in the balance bar, but rather the Coriolis deflection of the flow tube which occurs at the drive frequency. If the balance bar second bending mode resonant frequency is higher than the first bending mode (drive) frequency (ratio less than 1.0), then the balance bar second mode vibrates in phase with the flow tube Coriolis vibration as shown on FIG. 8. If the balance bar second mode frequency is below the drive frequency (ratio greater than 1.0), then the balance bar second mode vibrates out of phase with the flow tube Coriolis vibration as shown on FIG. 7.

When the balance bar second bending mode is out of phase with the flow tube Coriolis deflection as in FIG. 7, the magnet and coil of left velocity sensor SL both lag the flow tube midpoint while the magnet and coil of right velocity sensor SR both lead the flow tube midpoint. The signal output of each sensor no longer has its phase reduced by the zero phase shift of the balance bar (FIG. 1) as in prior art flowmeters. Furthermore, the vibration amplitude of the balance bar 602 second bending mode (and thus the velocity sensor phase shift) can be greatly increased by designing it so that its resonant frequency is close to the drive frequency. This results in a large increase in flowmeter sensitivity.

Figure 11:
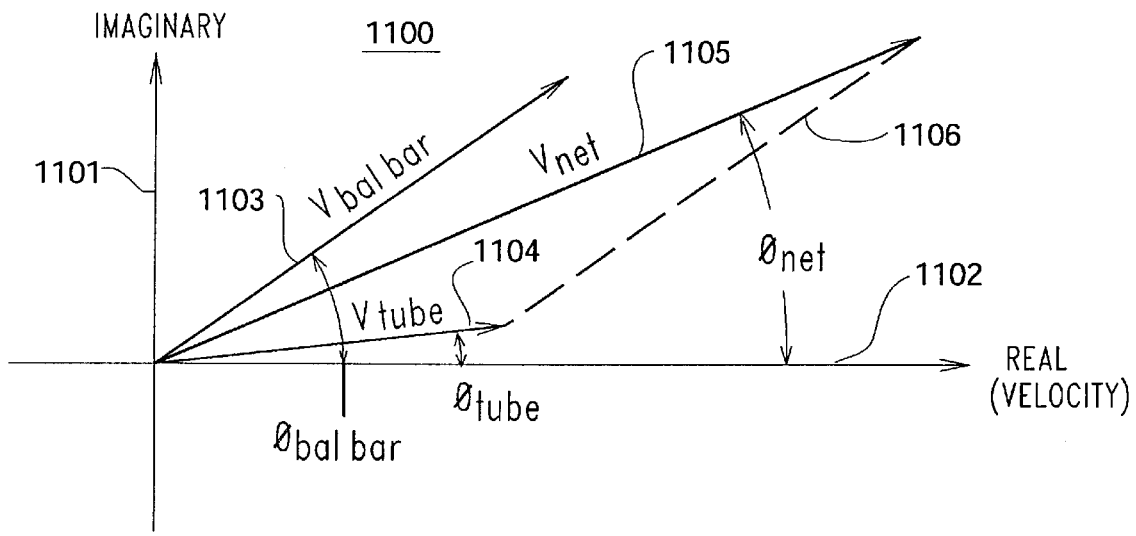
FIGS. 11 and 12 are vector diagrams of the single tube Coriolis flowmeter of the present invention.

The vector diagram for a Coriolis flowmeter having its balance bar second bending mode frequency slightly below the first bending mode (drive) frequency is shown in FIG. 11. The x axis 1102 represents the real velocity component of a vector. The y axis 1101 represents the imaginary component of a vector. The balance bar velocity vector is 1103. The flow tube velocity vector is 1104 and, as can be seen, the phase shift $\phi$ tube of the flow tube vector 1104 is less than the phase shift $\phi_{bal\ bar}$ of the balance bar vector 1103. The net signal out of velocity sensor SR is the vector sum (phase and amplitude) of balance bar vector 1103 and flow tube vector 1104. Vector 1105 represents the net output signal of the velocity sensor SR, and it has a phase difference $\phi_{net}$ with respect to the x axis. Since the net phase of sensor SR is greater than the phase of the flow tube, this geometry is seen to have a greater sensitivity than the prior art meters of FIG. 6 whose vector diagram is shown in FIG. 1.

Figure 8:
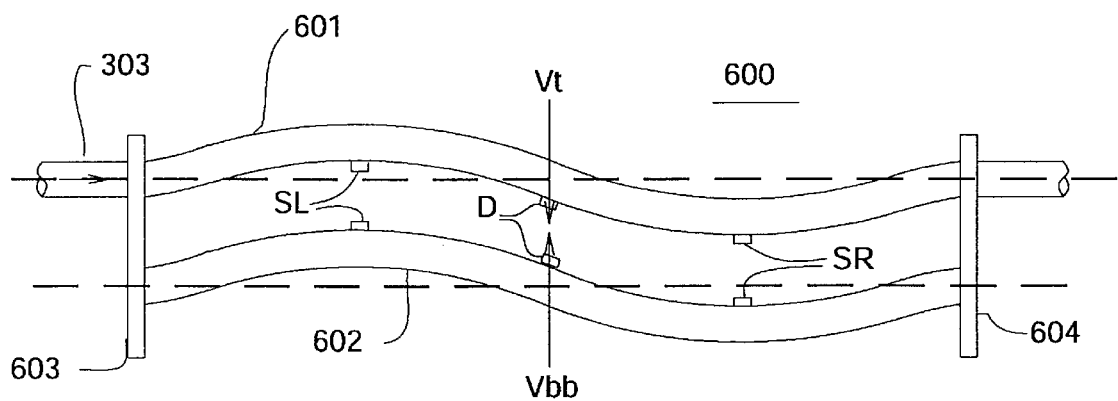

FIG. 8 shows an embodiment where the balance bar second bending mode frequency is slightly above the first bending mode drive frequency. Flow tube 601 and balance bar 602 are driven out of phase with each other in the first bending mode, resulting in them being in phase in the Coriolis-second bending mode. This causes the two parts of each velocity sensor, (the magnet and coil), to cancel each other in phase. In FIG. 8 the component of the right velocity sensor SR on the flow tube has already crossed zero (leading phase) while the component of SR on the balance bar has not yet crossed zero (lagging phase). When these two velocity vectors are added, as they are for the sensor voltage output, the phase lead and lag tend to cancel each other. The same holds true for left sensor SL. The result is a reduction in flowmeter sensitivity.

Figure 12:
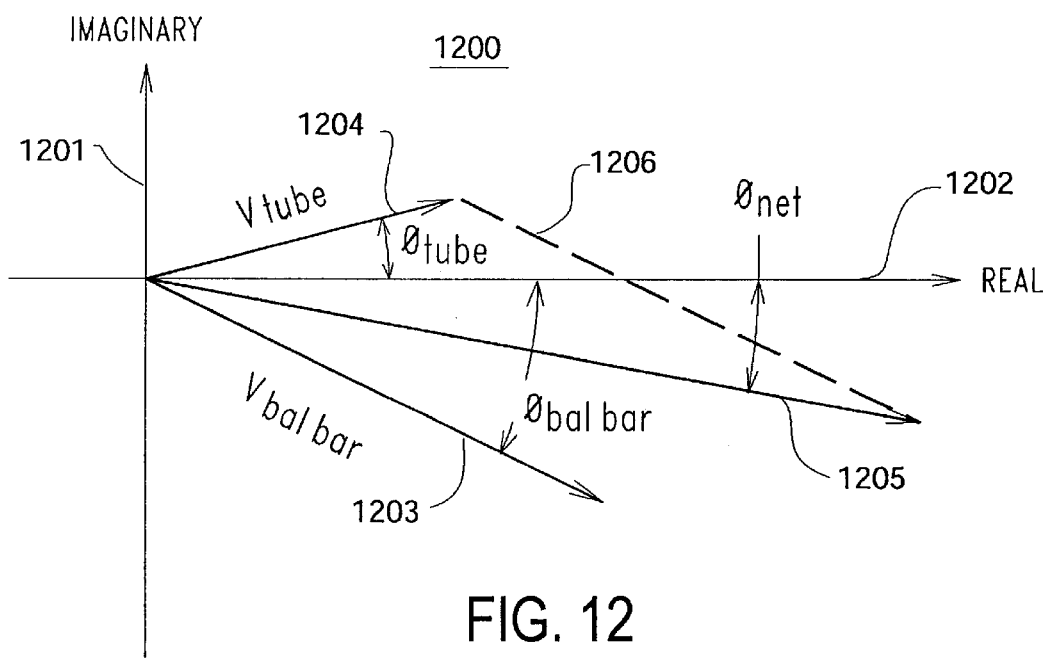

FIG. 12 illustrates the vector addition for a balance bar having its second bending mode frequency slightly above the first bending mode drive frequency. The velocity vector 1204 of the right sensor component on the flow tube is offset from the x axis 1202 by the angle $\phi_{tube}$. The velocity vector 1203 of the right sensor component on the balance bar is shown in the fourth quadrant and is offset from the x axis by the angle $\phi_{bal\ bar}$. The vector sum of flow tube vector 1204 and balance bar vector 1203 is vector 1205 and it is offset from the x axis 1202 by the angle $\phi_{net}$. As can be seen, the net phase of vector 1205 is now in the negative fourth quadrant. The balance bar negative phase added to the flow tube positive phase was enough to reduce the phase (and sensitivity) into the negative region. What this really means is that positive material flow will result in an indicated flow in the negative direction. This can be dealt with by changing the sign on the indicated flow rate, but there is another reason why having the balance bar second bending frequency slightly above the drive frequency is less than preferred.

The configuration of FIG. 7 in which the balance bar second bending mode frequency is below the drive mode frequency is also preferred to improve flowmeter balance. In this configuration the Coriolis force on flow tube 601 can be balanced by the second bending mode response of the balance bar. In conventional single tube Coriolis flowmeters, the balance bar dynamically balances the inertial forces on the flow tube in the first bending (drive) mode only. The second bending mode of in the balance bar is at a much higher frequency than the Coriolis deformation of the flow tube (which occurs at the drive frequency). Therefore, the second bending mode is not excited in the balance bar of prior art single tube Coriolis flowmeters. This results in the Coriolis forces being unbalanced as in FIG. 6 and flowmeter shaking occurs. The shaking amplitude, which is a function of both flow rate and mounting stiffness, can cause a shift in flowmeter sensitivity because of a shift in distance between the velocity sensors and the vibration end nodes. Since mounting stiffness is generally not known, the sensitivity shift cannot be predicted or compensated.

In the Coriolis flowmeter of the present invention, the balance bar second bending mode of the balance bar is excited by the Coriolis deflections of the flow tube. When the balance bar second bending mode frequency is below the first bending mode drive frequency, the two modes vibrate out of phase with each other and the inertial vibration forces of the balance bar's second bending mode largely cancel the shaking effect of the Coriolis force on the flow tube as shown on FIG. 7. Because the balance bar's excitation source for its second bending mode is the Coriolis deflection of the flow tube, the vibration amplitude of the balance bar's second bending mode increases as the Coriolis force on the flow tube increases. This provides the same degree of dynamic balance over all flow rates.

Thus far two embodiments have been discussed: that having the balance bar second bending mode frequency above the first bending mode (drive) frequency and the preferred embodiment which has the balance bar second bending mode frequency below the first bending mode (drive) frequency. The third possibility is having the two frequencies equal. This is possible, and is the most sensitive and best balanced embodiment. However, it has one major problem. The flow tube and balance bar are both driven in their first bending mode (which is now equal to the balance bar second bending mode frequency). The vibration frequency of the first bending mode changes with the density of the flowing material because the mass associated with the flow tube changes with the density of the flowing material. However, the frequency of the balance bar second bending mode does not change significantly with fluid density because it contains no fluid. This produces a situation in which the two frequencies (drive and second bending) match for only one material density. For lighter materials, the balance bar second bending mode frequency is below the first bending mode (drive) frequency and for heavier materials it is above the first bending mode (drive) frequency. For light material, the flow tube and balance bar then vibrate out of phase in the second bending-Coriolis mode; for the heavy material they vibrate in phase in the second bending-Coriolis mode. Furthermore, the flowmeter sensitivity amplification varies greatly with material density when the balance bar second bending mode frequency is in the immediate vicinity of the drive frequency (FIG. 9). This shifting flowmeter sensitivity can be compensated electronically based on frequency. However, for high flowmeter stability, the best design has the balance bar second bending mode frequency far enough below the first bending mode drive mode frequency that no anticipated contained fluid density can cause the frequencies to match. The best design also has the frequencies close enough to excite the balance bar in its second bending mode.

Design Details The preceding description has dealt with the desired relationship of the second bending mode frequency of the balance bar to the first bending mode drive frequency. The preferred embodiment has the frequency of the second bending mode sufficiently below the first bending mode drive frequency so that high density materials do not cause the two frequencies to cross. Having the second bending mode frequency below the first bending mode drive frequency is a unique situation that some would call impossible. The design details whereby this is accomplished follow.

The two factors that determine resonant frequency of a vibrating structure are mass and spring rate. The equation for resonant frequency is:

$$\omega = \sqrt{\frac{K}{M}}$$

Where:
  k=spring rate
  M=mass

In order to get the frequency of the second bending mode below the first bending mode (drive) frequency, changes must be made to the conventional balance bar that both raise its first bending mode (drive) frequency and lower its second bending mode frequency. Increasing mass and lowering spring rate (stiffness) both serve to lower frequency. To lower the resonant frequency of the second bending mode so that is lower than the first bending mode drive frequency requires that the mass and stiffness of the balance bar be modified in areas where they have more significance in one mode than the other. Changing the mass in areas of low vibration amplitude has little effect. Likewise changing stiffness, k, in areas of low bending moment has little effect.

Figure 13:
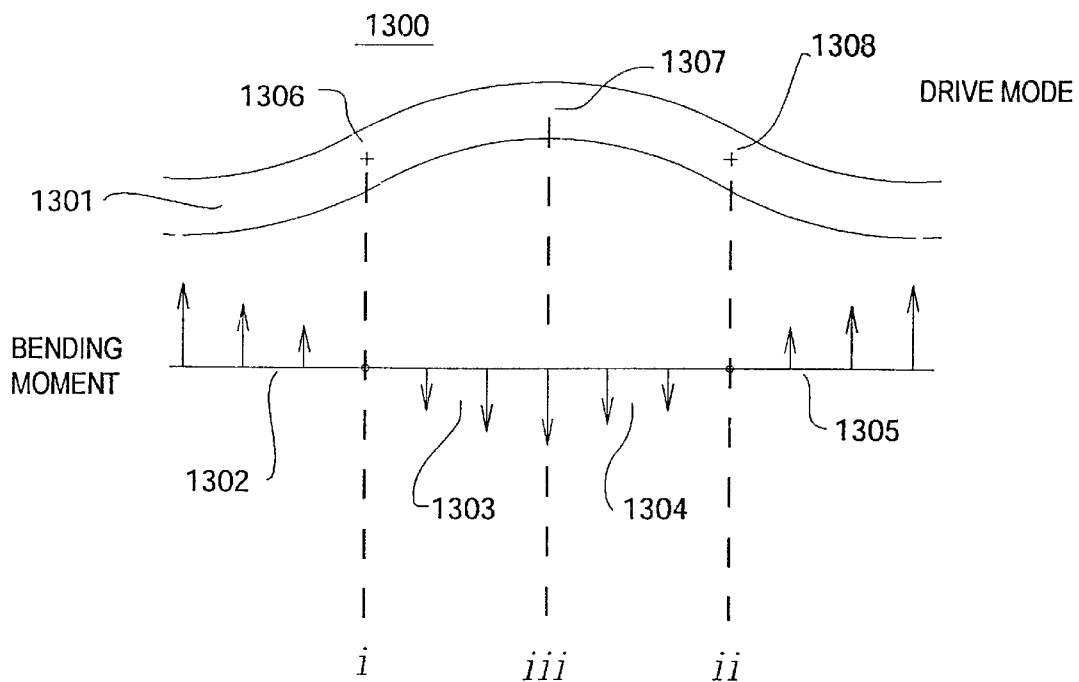
FIG. 13 discloses the mode shape and bending moments of the first bending mode of the balance bar of the present invention.
Figure 14:
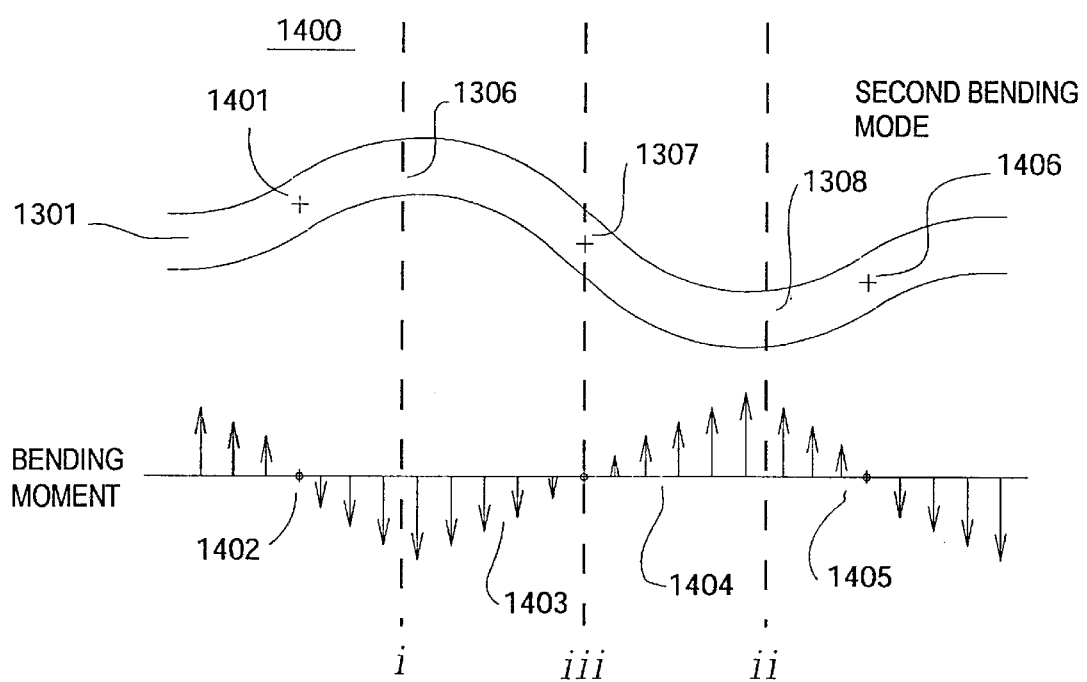
FIG. 14 discloses the mode shape and bending moments of the second bending mode of the balance bar of the present invention.

FIGS. 13 and 14 show the mode shapes and bending moment diagrams of the first and second bending modes of balance bar 1301. In order to soften (lower) k in the second bending mode without softening k in the first bending mode, balance bar 1301 stiffness can be reduced in those areas where its bending moment is near zero in the first bending mode and high in the second bending mode. Dashed lines i and ii of FIGS. 13 and 14 show these two locations to be 1306 and 1308. Lowering the stiffness, k, of balance bar 1301 at locations 1306 and 1308 has little effect on the frequency of the first bending mode of FIG. 13 since the flow tube is relatively straight and has a low bending moment in these locations in the first bending mode. Thus, lowering the stiffness and locations 1306 and 1308 does not effect the first bending mode (drive) frequency. However, as shown on FIG. 14, locations 1306 and 1308 have a high bending moment for the second bending mode. Thus, lowering the stiffness or spring rate of the balance bar at its locations 1306 and 1308 lowers the second bending mode frequency.

The first bending mode frequency of balance bar 1301 can be raised by increasing its stiffness in those areas where it has a high bending moment in its first bending mode and where the second bending mode has a bending moment near zero. Line iii of FIG. 14 shows this location to be 1307. An inspection of FIGS. 13 and 14 indicates that at location 1307, balance bar 1301 has a high bending moment in its first bending mode of FIG. 13 and a low bending moment in its second bending mode of FIG. 14. Thus, a balance bar that has an increased stiffness in area 1307 will have a higher drive frequency while leaving the second bending mode frequency of FIG. 14 unaffected.

To further lower the second bending mode frequency with respect to the first bending mode frequency, the mass of balance bar 1301 can be increased in those areas that have high amplitude in the second bending mode and low amplitude in the first bending mode. This is locations i and ii on FIGS. 13–17. Also, decreasing the mass at the line iii portion of balance bar 1301 on FIGS. 13–17 raises the drive frequency without impacting the second bending mode frequency. Since, as can be seen on FIGS. 13 and 14, the vibration amplitude for the first bending mode is high at location 1307 while the vibration amplitude for the second bending mode is low, as shown on FIG. 14. Thus, removing some of the mass from location 1307 of the balance bar raises the drive frequency but does not affect the second bending mode frequency.

Figure 15:
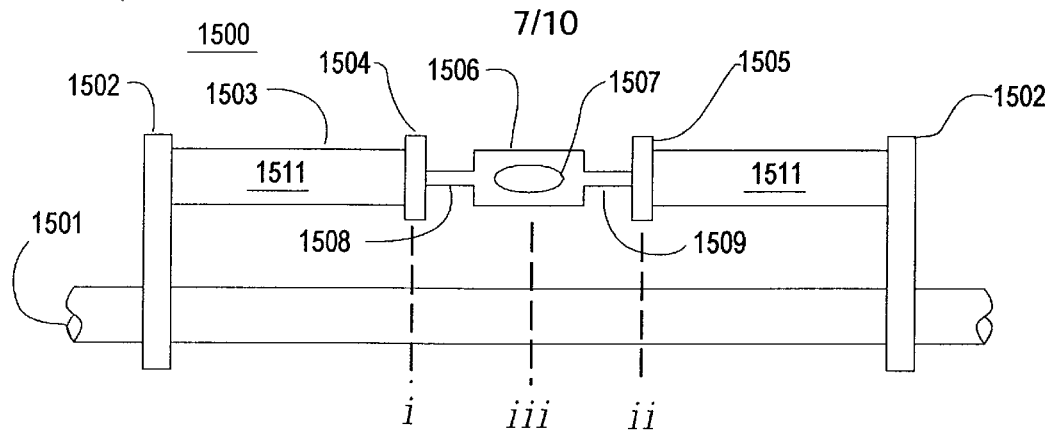
FIG. 15 discloses an embodiment of the present invention.
Figure 16:
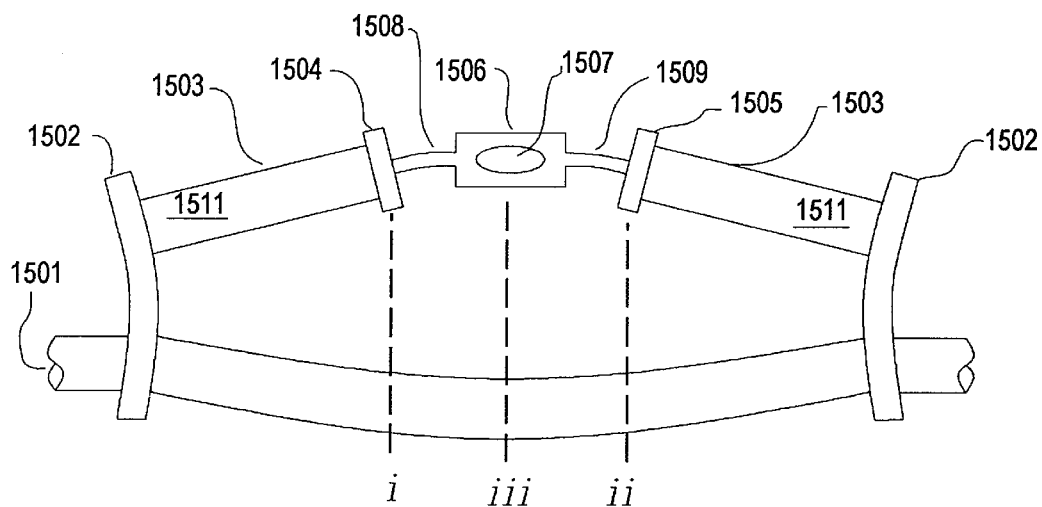
FIGS. 16 and 17 disclose the vibrational response characteristics of the Coriolis flowmeter of FIG. 15.
Figure 17:
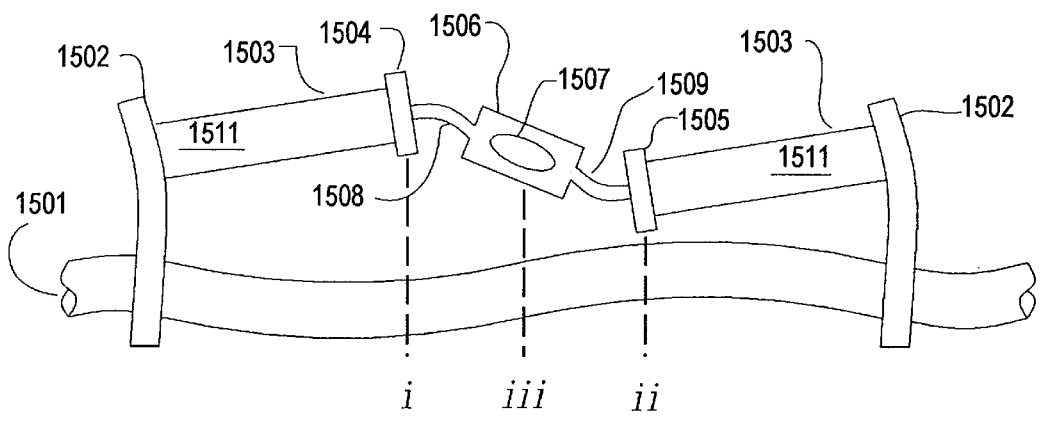

FIG. 15 show an embodiment of this design. Balance bar 1503 stiffness is reduced by removing material from portions 1508 and 1509 on either side of its center region element 1506. This raises the drive frequency only slightly while it lowers the second bending frequency considerably. Mass 1504 and 1505 is also added to the balance bar 1503 outside of the reduced stiffness region 1508 and 1509. This lowers the second bending mode frequency further. Mass is removed from the central portion 1506 of the balance bar 1503 leaving a void 1507. FIG. 16 shows the resulting drive mode shape and FIG. 17 shows the resulting Coriolis-second bending mode shape for the flowmeter of FIG. 15.

Figure 18:
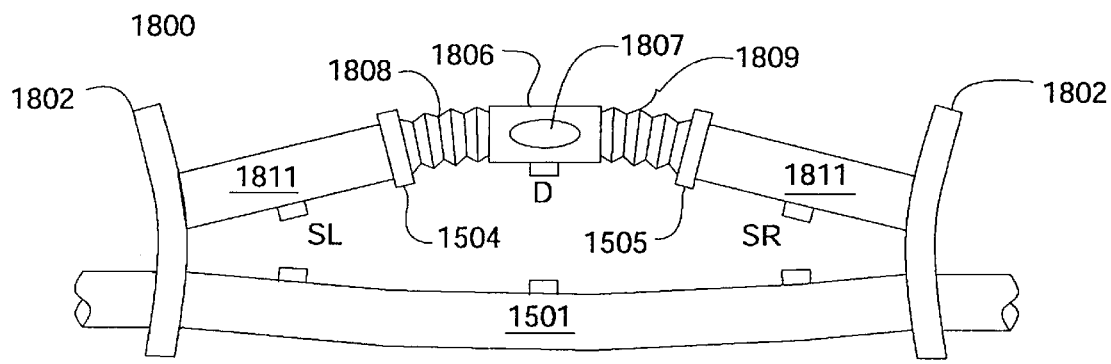
FIG. 18 discloses an alternative embodiment of the Coriolis flowmeter of the present invention.

FIG. 18 shows another embodiment of the invention using bellows 1808 and 1809 to reduce the balance bar stiffness. The embodiment of FIG. 18 is similar to that of FIGS. 15, 16 and 17 in that it has a center element 1806 comparable to element 1506 on FIG. 15. The FIG. 18 embodiment further has a reduced mass area 1807 comparable to element 1507 on FIG. 15. It also has added masses 1504 and 1505 comparable to the added masses of FIG. 15. Flexible bellows 1808 and 1809 on FIG. 18 have reduced stiffness comparable to elements 1508 and 1509 on FIG. 15. These characteristics of the embodiment of FIG. 18 serve to raise the drive frequency and lower the frequency of the second bending mode in the same manner as is the case for the embodiment of FIG. 15.

Figure 19:
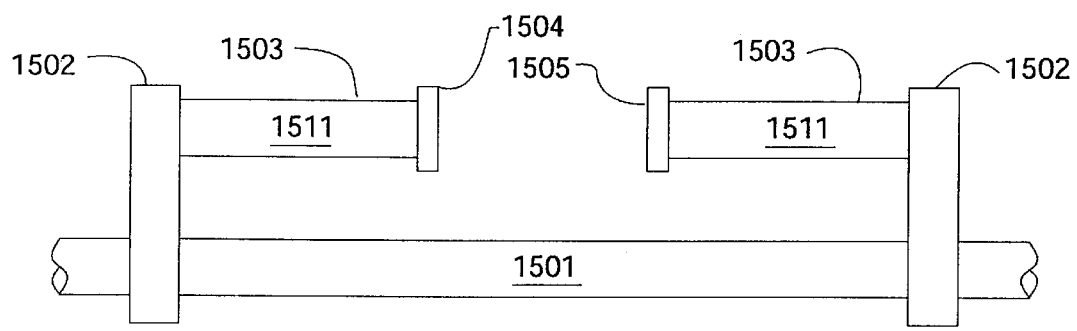
FIGS. 19, 20 and 21 disclose the vibrational characteristics of a conceptual straight tube Coriolis flowmeter.
Figure 20:
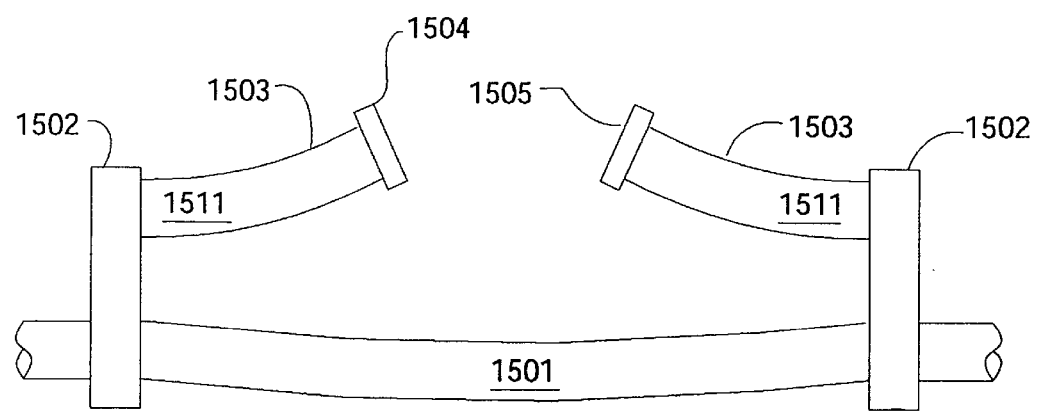
Figure 21:
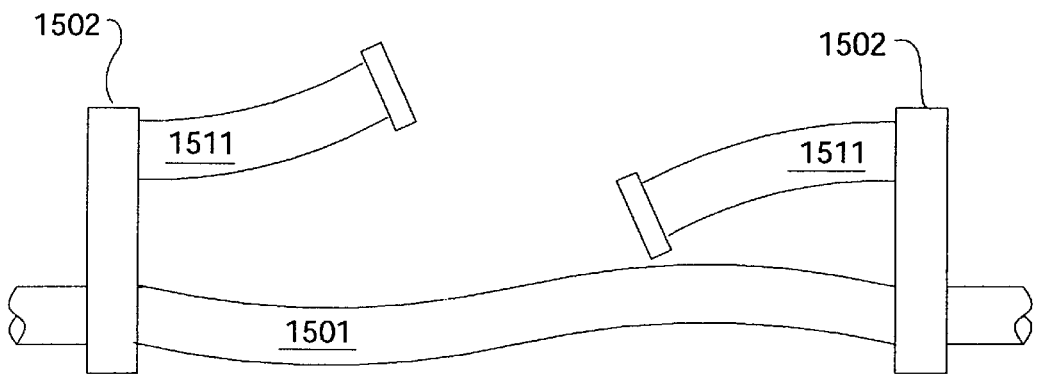

These design features described for FIGS. 15–18 can at best bring the second bending mode frequency of balance bar 1503 down to the first bending mode (drive) frequency. This can be illustrated by assuming that the central section of the balance bar 1503 has no mass and the reduced stiffness areas of the balance bar have no stiffness. In this most extreme case, the central section of the balance bar can be completely neglected and balance bar 1503 behaves like two independent cantilever beams 1511 (FIG. 19). The first bending (drive) mode shape then looks like FIG. 20 and the Coriolis-second bending mode shape looks like FIG. 21. There is no difference in the balance bar shapes between the drive mode and second bending mode except that in the drive mode of FIG. 20, the two balance bar beam ends 1511 are in phase and in the second bending mode of FIG. 21 they are out of phase with each other. Since the bar ends are not connected, their phase relationship with each other makes no difference to their resonant frequencies. Thus the second bending (out of phase) mode of FIG. 21 has a frequency equal to the first bending (in phase) mode of FIG. 20.

The final design feature needed to lower the second bending mode frequency below the drive frequency may be achieved by altering the spring stiffness of the balance bar so that it has less stiffness in the second bending mode than in the first bending mode. The essence of this design feature is that the balance bar is made extremely stiff (except for the two reduced stiffness zones 1508 and 1509 of FIG. 22) so that most of the flexing occurs in brace bar 1502. The net stiffness of balance bar 1503 then becomes a function of the vibration amplitude ratio between balance bar 1503 and flow tube 1501. The balance bar is made stiff in elements 1511. This has the effect of removing the effective spring from balance bar 1503 and concentrating the spring in brace bar 1502 so that the spring is adjacent to the end nodes. Moving the nodal location can then have a significant effect on the effective spring rate of the balance bar.

Figure 22:
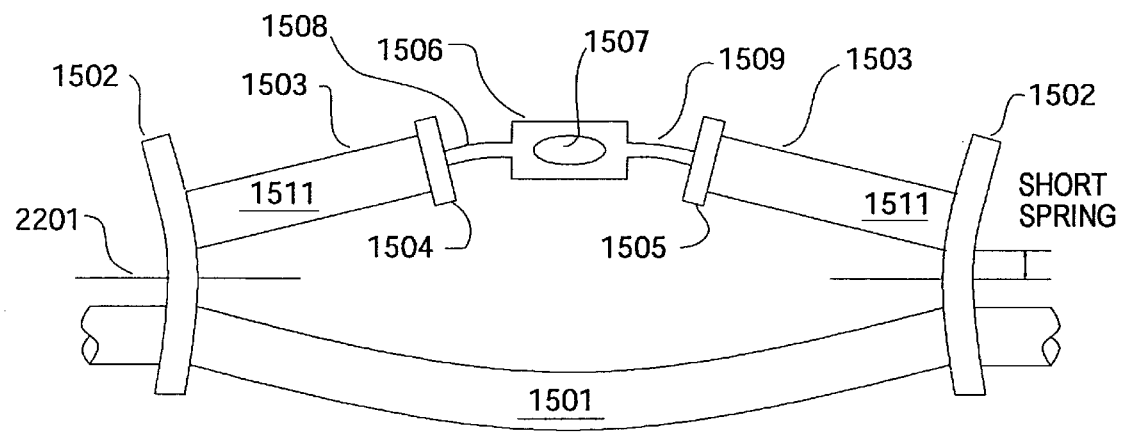
FIGS. 22, 23 and 24 disclose vibrational characteristics of one possible straight tube Coriolis flowmeter of the present invention.
Figure 23:
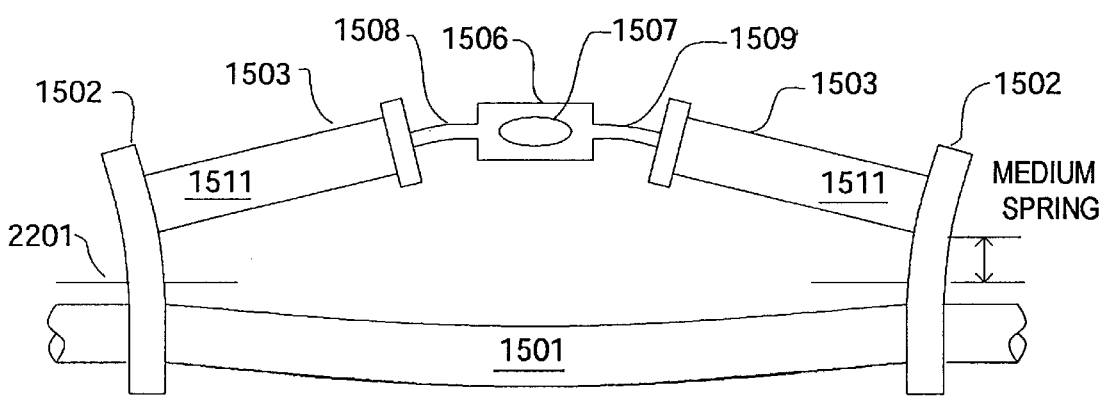

In FIG. 22 flow tube 1501 and balance bar 1503 have equal drive mode vibration amplitudes. FIG. 23 shows the same balance bar drive mode vibration amplitude in conjunction with a near zero flow tube vibration amplitude. In both figures, brace bar 1502 has a stationary node plane 2201 between flow tube 1501 and balance bar 1503. Stationary node plane 2201 is a zero vibration plane and vibrates with neither the flow tube nor the balance bar. In FIG. 22, because of the equal vibration amplitudes, stationary node plane 2201 is located approximately half way between flow tube 1501 and balance bar 1503. In FIG. 23, flow tube 1501 has a much lower vibration amplitude (and a larger mass) and therefore, stationary node plane 2201 in brace bar 1502 is located very near flow tube 1501. As far as the dynamics of the system are concerned, stationary node plane 2201 marks the end of the balance bar 1503 spring region in each brace bar 1502. The shorter effective spring of balance bar 1503 of FIG. 22 gives it a higher effective stiffness than the longer effective spring of balance bar 1503 of FIG. 23. With most of the spring function of balance bar 1503 residing in brace bars 1502, a higher flow tube/balance bar amplitude ratio results in a shorter and stiffer effective balance bar spring region than a lower amplitude ratio. Thus designing the meter so that it has a higher flow tube/balance bar amplitude ratio in the first bending (drive) mode than in the Coriolis-second bending mode can result in the Coriolis-second bending mode having a lower resonant frequency than the first bending (drive) mode. This is explained below.

The vibration amplitude ratio in the drive mode is determined by the mass and stiffness of the two vibrating members. If flow tube 1501 and balance bar 1503 have equal resonant frequencies (and they must for a dynamically balanced flowmeter) then the following relationship is true:

$$\sqrt{\frac{K_t}{M_t}} = \sqrt{\frac{K_{bb}}{M_{bb}}}$$

Also, the law of conservation of momentum holds:

$$M_t V_t = M_{bb} V_{bb}$$

It can be shown from these two laws that the vibration amplitude ratio is the inverse of the mass ratio and also that the mass ratio and stiffness ratio must be equal:

$$\frac{A_t}{A_{bb}} = \frac{M_{bb}}{M_t} = \frac{K_{bb}}{K_t}$$

Therefore, for balance bar 1503 to have a lower vibration amplitude than flow tube 1501, the balance bar needs to have a higher mass and stiffness than the flow tube.

Figure 24:
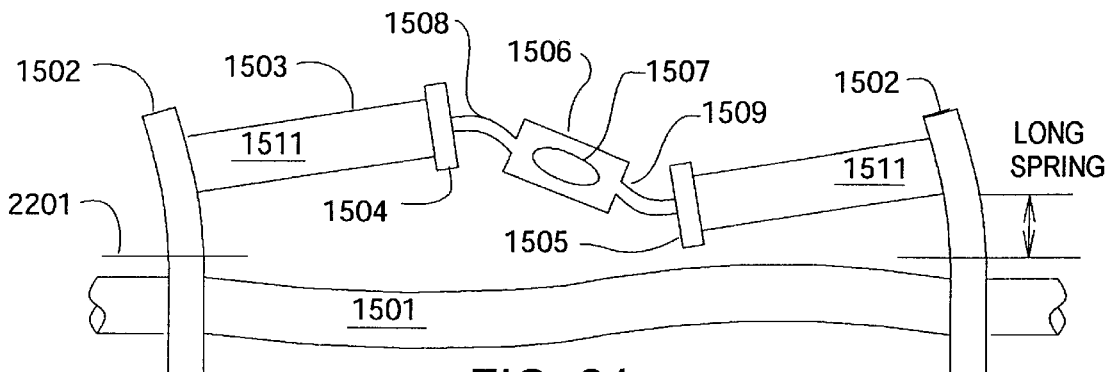

The drive frequency is raised above the Coriolis second bending mode frequency in the following manner. The vibration amplitude ratio in the first bending mode between flow tube 1501 and balance bar 1503 is made high. This is done by making balance bar 1503 and its elements 1511 heavy and stiff compared to flow tube 1501. The result is that the stationary node plane 2201 in brace bar 1502 is close to balance bar 1503. This makes the spring rate of balance bar 1503 (in the drive mode) high. In the Coriolis second bending mode, however, the amplitude ratio is reversed. The flow tube Coriolis deflection amplitude is low because it is not being driven at its resonant frequency by the Coriolis force. The balance bar amplitude in the second bending mode is high because it is being excited by the Coriolis deflection of flow tube 1501 at or near its second bending mode resonant frequency. The flow tube/balance bar vibration amplitude ratio in the Coriolis second bending mode is thus low and results in the stationary node planes being close to flow tube 1501. This makes the balance bar springs relatively long and the balance bar spring rate low in the Coriolis second bending mode. This lowers the second bending mode frequency. The Coriolis second bending mode with the low amplitude ratio is shown in FIG. 24. Because the vibration amplitude ratio is high in the drive mode and is low in the Coriolis second bending mode, the balance bar springs (which reside in brace bar 1502) are stiffer in the drive mode than in the Coriolis second bending mode. This enables the second bending mode to actually have a lower frequency than the first bending drive mode.

In summary, there are four design features that characterize the present invention. First, the stiffness of balance bar 1503 is reduced on both sides of its central region 1506. This lowers the balance bar second bending resonant frequency. This is done by elements 1508 and 1509 which are flexible and have a low spring rate. Second, the mass of balance bar 1503 is reduced in its central region 1506 and increased immediately outside of the reduced stiffness regions 1508 and 1509. This raises the drive frequency and lowers the balance bar second bending mode frequency. Third, balance bar 1503 is made stiff in its beam elements 1511 so that much of the spring of the vibrating structure occurs in brace bar 1502. This causes the balance bar spring stiffness to become a function of the vibration amplitude ratio between the flow tube and the balance bar. Fourth, the relative mass and stiffnesses of flow tube 1501 and balance bar 1503 is such that the vibration amplitude ratio (flow tube/balance bar) is higher in the drive mode than in the Coriolis-second bending mode. This allows the balance bar second bending mode to have a resonant frequency slightly less than the first bending (drive) mode. It may not be necessary to employ all of these design features to effect the sensitivity enhancement of a Coriolis flowmeter embodying the present invention. It is only necessary to employ enough of these features to reduce the balance bar 1503 second bending mode frequency to be below the drive frequency.

Figure 25:
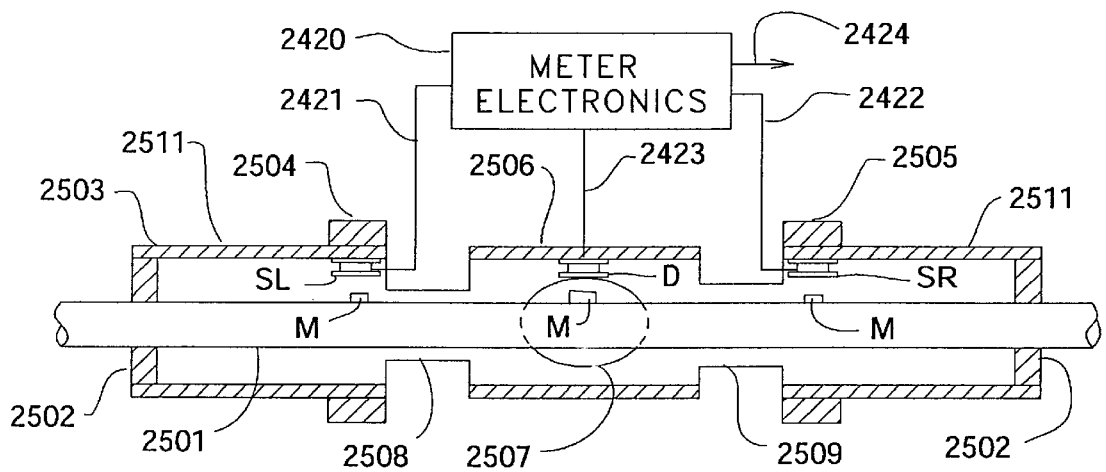
FIG. 25 discloses an alternative embodiment of a Coriolis straight tube flowmeter of the present invention.
Figure 26:
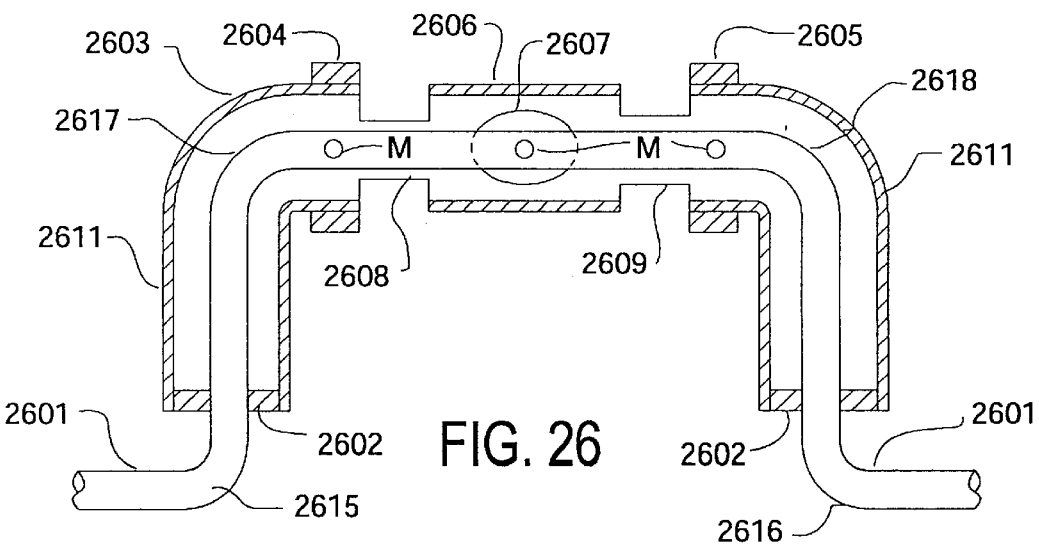
FIG. 26 discloses a Coriolis flowmeter embodying the present invention and having a curved flow tube and surrounding balance bar.

The preceding described embodiments of the invention have the form of a single straight tube with a parallel balance bar beside the flow tube. This has been done only for clarity of the inventive concepts. The principles and design features of the invention apply equally well to a single straight tube Coriolis flowmeter with a concentric balance bar (FIG. 25) as well as to single curved tube flowmeters (FIG. 26) with concentric balance bars. The preferred embodiment is the single straight tube with concentric balance bar of FIG. 25. FIG. 25 and FIG. 26, for clarity, have the balance bar front half removed so that the flow tube can be seen. FIG. 25 is the simplest and most compact embodiment. The sensitivity enhancing balance bar 2503 increases its sensitivity to the point where its accuracy can rival curved tube Coriolis flowmeters.

The embodiment of FIG. 25 is similar to that of FIGS. 22–24 except that the balance bar 2503 is concentric with and surrounds flow tube 2501. Balance bar 2503 is connected at its ends by brace bars 2502 to flow tube 2501. The center portion of the balance bar 2503 is light weight due to void 2507. Sections 2508 and 2509 are of reduced stiffness. Balance bar 2503 also has added mass elements 2504 and 2505 corresponding to elements 1504 and 1505 on FIGS. 22–24. This design of the embodiment of FIG. 25 permits the second bending mode frequency of balance bar 2503 to be slightly lower than the first bending mode (drive) frequency and provides the same advantages formerly described for the embodiment of FIGS. 22–24.

FIG. 26 discloses embodiment which is similar in most respects to that of FIG. 25 except that flow tube 2601 and its surrounding concentric balance bar 2603 are not straight but instead, are curved upwards from horizontal at portions 2615 and 2616 from which they extend upward until they make the transition from vertical to a horizontal at areas 2617 and 2618. The center portion 2606 of brace bar 2603 has a low mass area 2607 comprising a void and elongated elements 2608 and 2609 which additionally have a low spring rate. Elements 2604 and 2605 provide additional mass in the same manner as do elements 2504 and 2505 of the embodiment of FIG. 25 and in the same manner as do elements 1504 and 1505 in the embodiment of FIG. 22–24.

On FIG. 25, meter electronics element 2420 applies drives signals via path 2423 to driver D which cooperates with an adjacent magnet M to vibrate the flow tube 2501 and balance bar 2503 out of phase with each other at a resonant drive frequency. With material flow in the vibrating flow tube, Coriolis forces are applied to the flow tube to deflect its left-hand portion out of phase with respect to its right-hand portion as is well known in art. These Coriolis deflections are detected by left sensor SL and right sensor SR. Signals representing the Coriolis deflections are applied over paths 2421 and 2422 to meter electronics 2420 which processes the signals in the conventional manner to generate output information pertaining to the flowing material. This information is applied to path 2424 and may include material density, material flow rate, etc. On FIG. 25, driver D, left sensor SL and right sensor SR each comprise the coil/magnet pair with the magnets being designated M and attached to the flow tube proximate the coil SL, D, and SR of each coil/magnet pair.

The embodiment of FIG. 26 is similarly associated with an electronics element (not shown) comparable to meter electronics 2420. The embodiment of FIG. 26 similarly has a driver D, a left sensor SL and a right sensor SR (all not shown) in the view of FIG. 26 since the flow tube vibrates in a plane transverse to the presentation of FIG. 26. In this view, only the left magnet M associated with sensor SL (not shown) and the center magnet M associated with driver D (not shown) and the right-hand magnet M associated with sensor SR (not shown) may be seen on FIG. 26.

It is to be expressly understood that the claimed invention is not to be limited to the description of the preferred embodiment but encompasses other modifications and alterations within the scope and spirit of the inventive concept.

We claim:

1. A method of operating a Coriolis flowmeter having a flow tube and a balance bar oriented substantially parallel to said flow tube and further having brace bar means for coupling said balance bar to said flow tube; said method comprising the steps of:

flowing material through said flow tube;

vibrating said flow tube and balance bar out of phase with respect to each other in a drive mode having a drive frequency substantially equal to the resonant frequency of said material filled flow tube and said balance bar;

inducing periodic Coriolis deflections in said vibrating flow tube having said material flow;

said periodic Coriolis deflections being characterized by regions of deflection as well as nodes having no deflection;

inducing Coriolis like deflections in said balance bar at said drive frequency in response to said Coriolis deflections of said flow tube;

said Coriolis like deflections having the same number of nodes as said periodic Coriolis deflections;

said Coriolis like deflections define an induced mode of vibration of said balance bar having a resonant frequency sufficiently close to the frequency of said periodic Coriolis deflections to increase the amplitude of said Coriolis like deflections in said balance bar;

said Coriolis like deflections of said balance bar having an amplitude proportional to the magnitude of periodic Coriolis forces of said vibrating flow tube with material flow;

detecting the velocity of said flow tube with respect to said velocity of said balance bar;

generating signals representing said velocity of said flow tube and said velocity of said balance bar; and deriving information regarding said flowing material in response to said generation of said signals.

2. The method of claim 1 wherein said step of inducing said Coriolis like deflections includes the step of inducing said induced mode vibrations having a resonant frequency less than said drive frequency.

3. The method of claim 1 wherein said step of inducing said Coriolis like deflections includes the step of inducing said induced mode vibrations having a resonant frequency greater than said drive frequency.

4. The method of claim 1 wherein said step of inducing said Coriolis like deflections includes the step of inducing said induced mode vibrations having a resonant frequency substantially equal to said drive frequency.

5. The method of claim 1 wherein said step of inducing vibrations in said balance bar includes the step of extending forces indicative of said periodic Coriolis deflections from said flow tube through said brace bar to said balance bar to induce said Coriolis like deflections in said balance bar.

6. The method of claim 1 wherein said steps of vibrating said balance bar includes the steps of:
flexing ends of said flow tube in response to said periodic Coriolis deflections to flex a first end of said brace bar; and
flexing a second end of said brace bar in response to said flexing of said first end to induce said Coriolis like deflections in said balance bar.

7. The method of claim 1 wherein said step of inducing said Coriolis like deflections in said vibrating balance bar includes the steps of:
inducing said Coriolis like deflections in said balance bar at a second bending mode having a resonant frequency substantially equal to said drive frequency; and
operating said balance bar as mechanical amplifier by inducing said Coriolis like deflections in said balance bar at a second bending mode resonant frequency of said balance bar at an amplitude greater than the vibrational amplitude of said Coriolis deflections of said flow tube at said periodic Coriolis deflection frequency.

8. The method of claim 1 further comprising the step of transferring the effective spring of said balance bar from said balance bar to said brace bar means to lower a second bending mode resonant frequency of said balance bar.

9. The method of claim 1 further comprising the step of lowering the resonant frequency of said induced vibrations of said balance bar by lowering the effective spring of said balance bar.

10. The method of claim 9 further comprising the step of lowering the frequency of said induced vibrations of said balance bar by the provision of at least one flexible portion of said balance bar together with the provision of increased mass on at least one other portion of said balance bar.

11. The method of claim 10 further comprising the step of providing a void in at least one portion of said balance bar.

12. The method of claim 1 wherein said method comprises the step of lowering the resonant frequency of said induced vibrations of said balance bar by the provision of flexible portions of said balance bar at locations of high bending moment of said balance bar in said additional mode.

13. The method of claim 1 further comprising the step of maintaining the end nodes of said vibrating flow tube and said balance bar in said brace bar.

14. The method of claim 13 wherein said step of maintaining comprises the provision of stiff sections of said balance bar and flexible sections of said balance bar not comprising a stiff section.

15. The method of claim 1 wherein said Coriolis like deflections of said balance bar are out of phase with the periodic Coriolis deflections of said flow tube.

16. The method of claim 1 wherein said drive mode comprises a first bending mode and wherein said induced vibrations of said balance bar comprise the second bending mode of said balance bar.

17. The method of claim 16 further comprising the step of lowering the resonant frequency of said second bending mode of said balance bar by the provision of a center portion of said balance bar and a flexible portion on each side of said center portion of said balance bar together with the provision of increased mass on each side of said center portion.

18. The method of claim 16 further including the said step of lowering said resonant frequency of said second bending mode of said balance bar by the provision of flexible portions of said balance bar at locations of high bending moment of said balance bar and increased mass at locations of high vibrational amplitude in said second bending mode.

19. The method of claim 1 wherein said Coriolis like deflections induced in said balance bar are in phase with the periodic Coriolis deflections of said flow tube.

20. The method of claim 1 wherein said step of inducing said Coriolis like deflections in said balance bar includes the step of inducing said Coriolis like deflections to induce said induced mode of vibration having a resonant frequency proximate said drive frequency.

21. The method of claim 1 wherein the step of inducing said Coriolis like deflections in said balance bar includes the step of inducing Coriolis like deflections in said balance bar with said Coriolis like deflections defining an induced mode of vibration of said balance bar having a resonant frequency lower than the frequency at which said flow tube is vibrated;
said Coriolis like deflections being out of phase with said Coriolis deflections of said flow tube and having an amplitude proportional to the magnitude of periodic Coriolis forces on said vibrating flow tube with material flow.

22. A Coriolis flowmeter having a flow tube adapted to receive a material flow, a balance bar oriented substantially parallel to said flow tube and a brace bar means for coupling said balance bar to said flow tube; said Coriolis flowmeter further comprising:
drive means for vibrating said flow tube and balance bar out of phase with respect to each other at a drive mode having a frequency substantially equal to the resonant frequency of said material filled flow tube and said balance bar;
means for inducing periodic Coriolis deflections in said vibrating flow tube having said material flow;
said periodic Coriolis deflections being characterized by regions of deflection as well as nodes having no deflection;
means for inducing Coriolis like deflections in said balance bar with said Coriolis life deflections having the same number of nodes as said periodic Coriolis deflections;

said Coriolis like deflections define an induced mode of vibration of said balance bar having a resonant frequency sufficiently close to said frequency of said periodic Coriolis deflections to increase the amplitude of said Coriolis like deflections in said balance bar;

said Coriolis like deflections of said balance bar having an amplitude proportional to the magnitude of periodic Coriolis forces on said vibrating flow tube with material flow;

means for detecting the velocity of said flow tube with respect to said velocity of said balance bar;

means for generating signals representing said periodic Coriolis deflections of said flow tube and said Coriolis like deflections of said balance bar; and means for deriving material flow information in response to said generation of said signals.

23. The Coriolis flowmeter of claim 22 wherein said means for vibrating said balance bar includes means for inducing said Coriolis like deflections in said balance bar with said induced mode of vibration having a resonant frequency less than said drive frequency.

24. The Coriolis flowmeter of claim 22 wherein said means for vibrating said balance bar includes means for inducing said Coriolis like deflections in said balance bar with said induced mode of vibration having a resonant frequency greater than said drive frequency.

25. The Coriolis flowmeter of claim 22 wherein said means for vibrating said balance bar includes means for inducing said Coriolis like deflections in said balance bar with said induced mode of vibration having a resonant frequency substantially equal to said drive frequency.

26. The Coriolis flowmeter of claim 22 wherein said means for vibrating said balance bar includes means for extending forces indicative of said periodic Coriolis deflections from said at least one flow tube through said brace bar means to said balance bar to induce said Coriolis like deflections in said balance bar.

27. The Coriolis flowmeter of claim 22 wherein said means for inducing said Coriolis like deflections in said balance bar includes:

means for flexing ends of said flow tube in response to said periodic Coriolis deflections to flex a first end of said brace bar; and means for flexing a second end of said brace bar in response to said flexing of said first end to induce said Coriolis like deflections in said balance bar.

28. The Coriolis flowmeter of claim 22 further comprising means for lowering the resonant frequency of said (additional induced mode of vibration of said balance bar to a value approximate that of said drive frequency.

29. The Coriolis flowmeter of claim 28 wherein said means for lowering comprises added mass in regions of high vibrational amplitude in said Coriolis like deflections and comprises flexible portions of said balance bar at locations of high bending moment of said Coriolis like deflections.

30. The Coriolis flowmeter of claim 29 further comprising means for reducing the effective spring of said balance bar to reduce the frequency of said induced mode of vibration of said balance bar.

31. The Coriolis flowmeter of claim 28 wherein said drive mode comprises a first bending mode and wherein said induced mode of vibration of said balance bar comprises a second bending mode.

32. The Coriolis flowmeter of claim 31 wherein said means for lowering further comprises a rigid center portion and an added mass on each side of said rigid center portion.

33. The Coriolis flowmeter of claim 32 wherein said means for lowering further comprises flexible portions of said balance bar at locations on either side of said rigid center portion.

34. The Coriolis flowmeter of claim 33 further including wherein said means for lowering further comprises a void in said rigid center portion for raising said drive frequency.

35. The Coriolis flowmeter of claim 33 wherein said flexible portions comprises bellows.

36. The Coriolis flowmeter of claim 22 further comprising means for concentrating the effective spring of said flow tube and said balance bar in said brace bar.

37. The Coriolis flowmeter of claim 36 wherein said means for concentrating comprises stiff members on said balance bar and flexible members on each portion of said balance bar not comprising a stiff member.

38. The Coriolis flowmeter of claim 22 further comprising means for maintaining the end node of said flow tube and said balance bar in said brace bar.

39. The Coriolis flowmeter of claim 22 comprising a substantially straight flow tube and a substantially straight balance bar.

40. The Coriolis flowmeter of claim 22 comprising said flow tube having a curved portion and said balance bar having a curved portion.

41. The Coriolis flowmeter of claim 22 wherein said induced mode of vibration comprises the second bending mode of said balance bar.

42. The Coriolis flowmeter of claim 20 wherein said means for inducing Coriolis deflection in said balance bar comprises:

means for inducing Coriolis like deflections in said balance bar with said Coriolis like deflections defining an induced mode of vibration of said balance bar having a resonant frequency lower than the frequency at which said flow tube is vibrated;

said Coriolis like deflections in said balance bar being out of phase with said Coriolis deflections of said flow tube and having an amplitude proportional to the magnitude of periodic Coriolis forces on said vibrating flow tube with material flow.

* * * * *